(12) United States Patent
Banko

(10) Patent No.: US 8,961,184 B1
(45) Date of Patent: Feb. 24, 2015

(54) MATHEMATICS TEACHING APPARATUS WITH VISUAL TACTILE AND AUDITORY STIMULI

(75) Inventor: William Banko, Armonk, NY (US)

(73) Assignee: Kid Knowledge, Inc, Armonk, NY (US)

( * ) Notice: Subject to any disclaimer, the term of this patent is extended or adjusted under 35 U.S.C. 154(b) by 668 days.

(21) Appl. No.: 12/964,904

(22) Filed: Dec. 10, 2010

(51) Int. Cl.
G09B 19/02 (2006.01)

(52) U.S. Cl.
CPC .............. *G09B 19/025* (2013.01); *G09B 19/02* (2013.01)
USPC ......................................................... 434/188

(58) Field of Classification Search
CPC ................................ G09B 19/02; G09B 19/025
USPC .................. 434/188, 191, 201, 202, 283, 322
See application file for complete search history.

(56) References Cited

U.S. PATENT DOCUMENTS

| | | | | |
|---|---|---|---|---|
| 3,311,997 A | * | 4/1967 | Denny | 434/194 |
| 3,314,165 A | * | 4/1967 | Shreck et al. | 434/343 |
| 4,552,360 A | * | 11/1985 | Bromley et al. | 463/38 |
| 4,639,225 A | * | 1/1987 | Washizuka | 434/308 |
| 5,346,399 A | * | 9/1994 | Sakow | 434/201 |
| 5,411,259 A | * | 5/1995 | Pearson et al. | 463/36 |
| 5,813,861 A | * | 9/1998 | Wood | 434/169 |
| 5,855,483 A | * | 1/1999 | Collins et al. | 434/322 |
| 5,876,212 A | * | 3/1999 | Hartung | 434/207 |
| 7,018,213 B2 | | 3/2006 | Marcus | 434/322 |
| 7,029,283 B2 | * | 4/2006 | Marcus et al. | 434/323 |
| 8,179,563 B2 | * | 5/2012 | King et al. | 358/1.6 |
| 8,206,223 B2 | * | 6/2012 | Marans et al. | 463/43 |

OTHER PUBLICATIONS

U.S. Appl. No. 12/819,031, filed Jun. 2010, Goll, Karen.*

* cited by examiner

*Primary Examiner* — Sam Yao
*Assistant Examiner* — Michael Humphrey
(74) *Attorney, Agent, or Firm* — Leason Ellis LLP.

(57) ABSTRACT

Apparatus for teaching mathematics has numerical and mathematical operational inputs by way of coded cards placed in respective card readers and a keypad that produces number values and numerical equations. The number values and equation results are compared to the numeric value of weight objects placed on a scale by the student. The apparatus is bi-directional in that unit weights are placed on the scale to attempt to match the numeric values and the equation solution values produced by the cards and keypad or the cards and keypad entries for numerical values and equations are made to match the numeric value of the unit weight objects on the scale. The student is informed of the result of the comparison in terms of correct or incorrect, or by explanatory messages to either increase or decrease the unit weight value or change the number value or the equation.

20 Claims, 7 Drawing Sheets

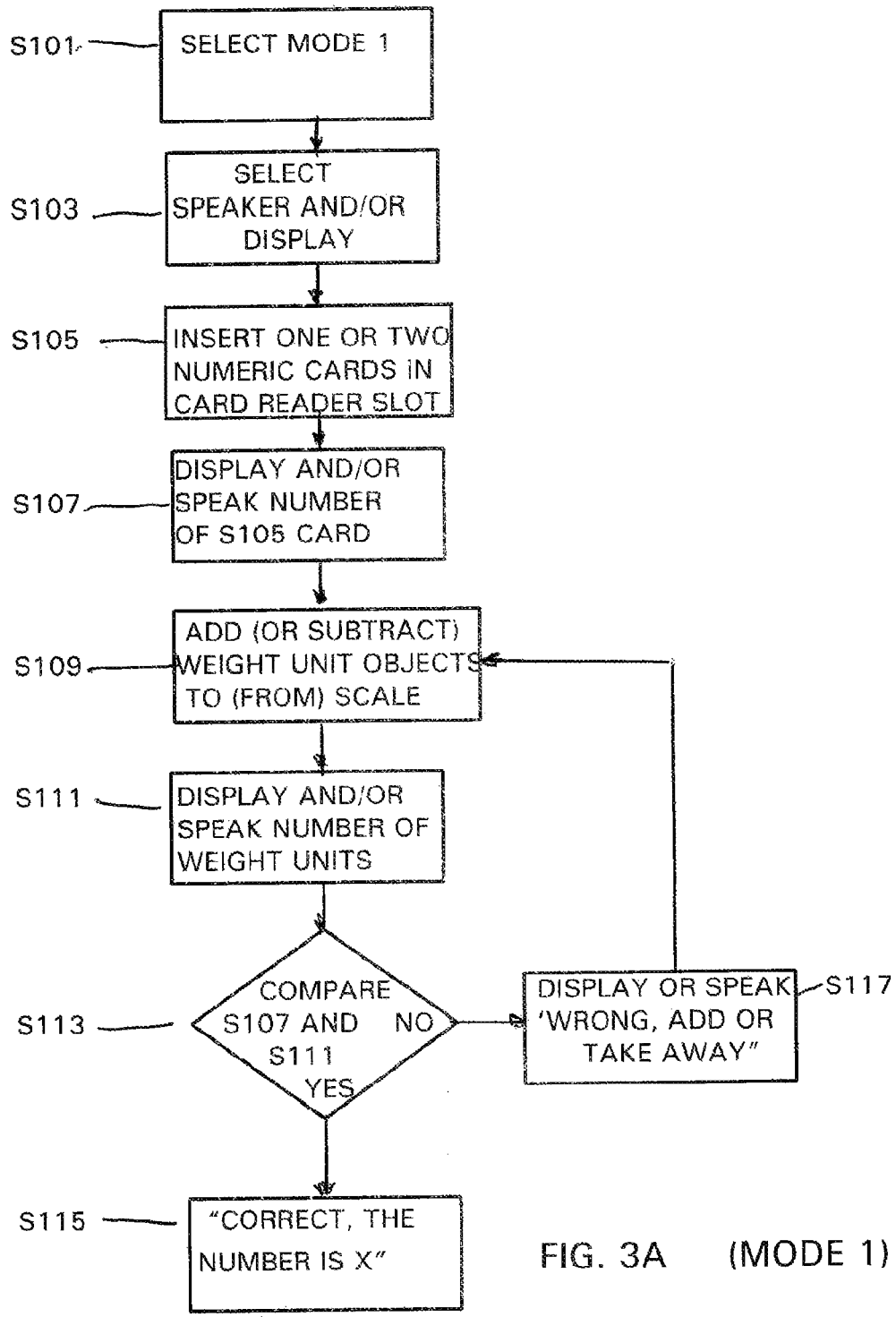
FIG. 3A (MODE 1)

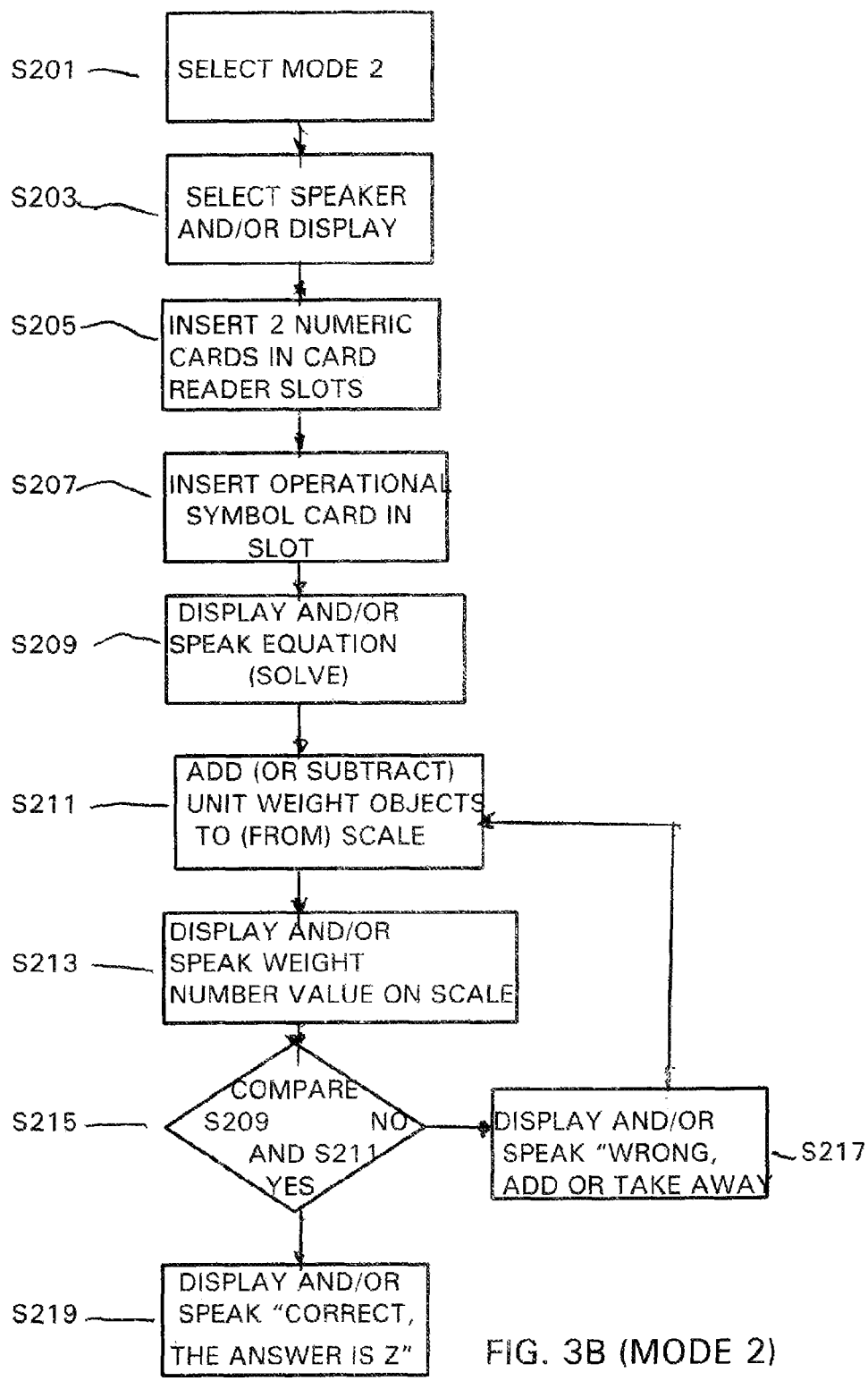
FIG. 3B (MODE 2)

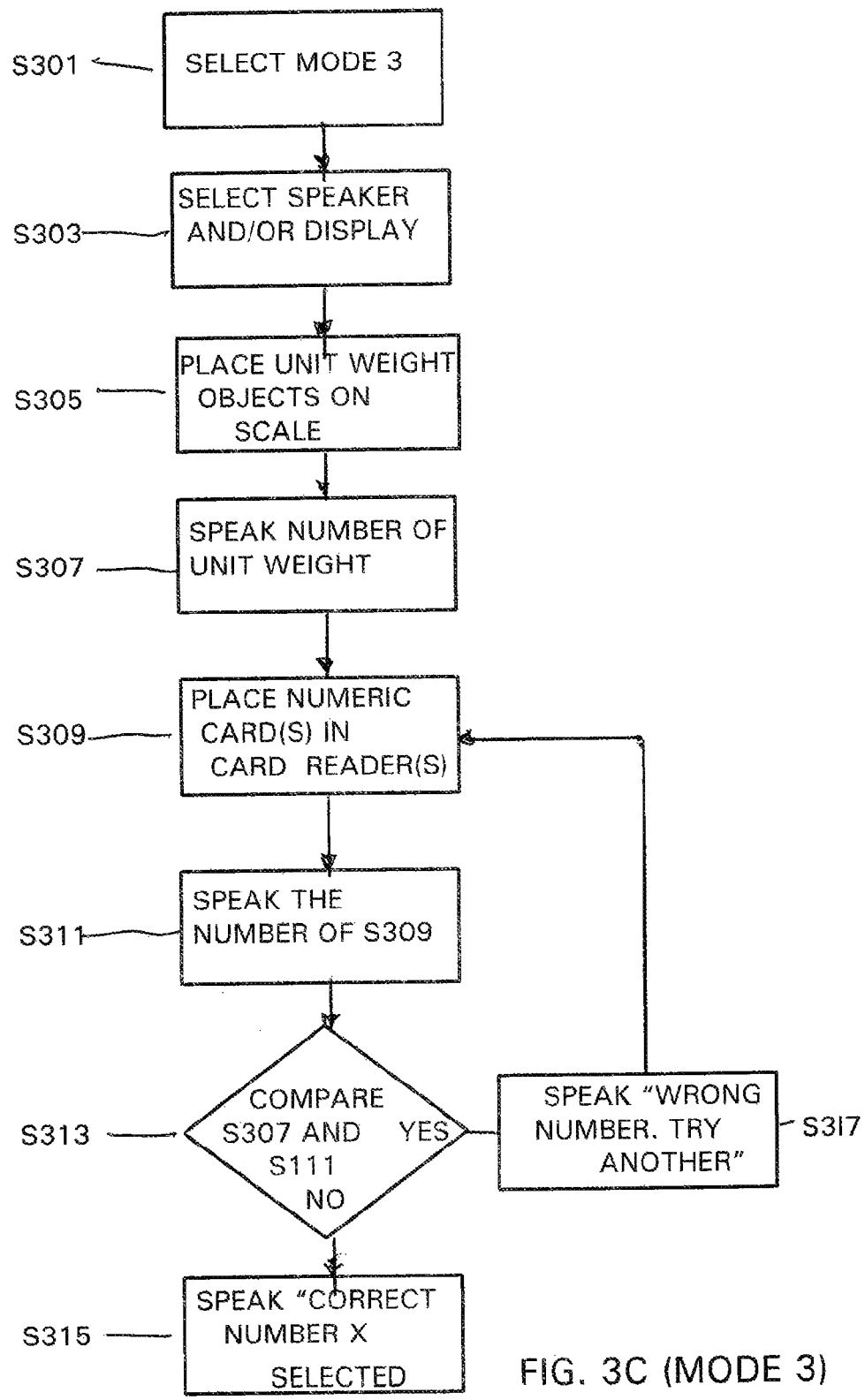
FIG. 3C (MODE 3)

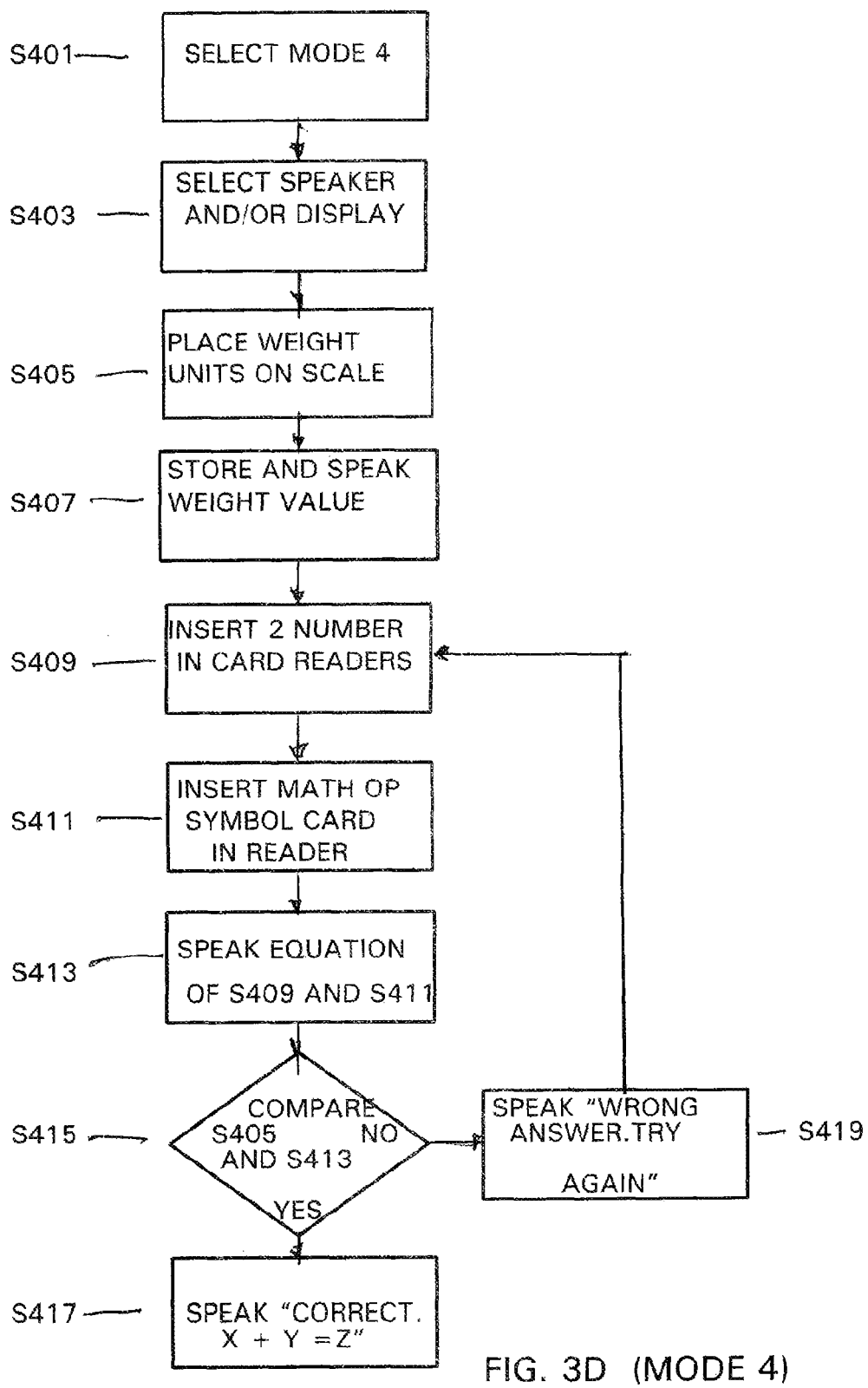
FIG. 3D (MODE 4)

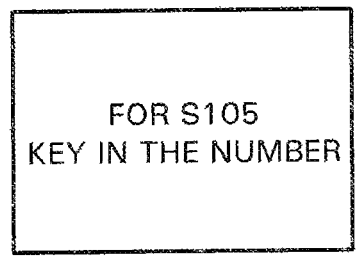 MODE 1
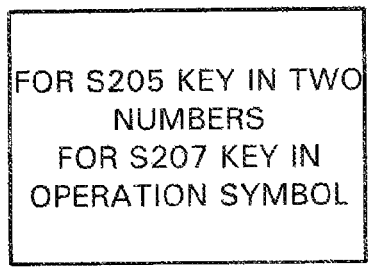 MODE 2
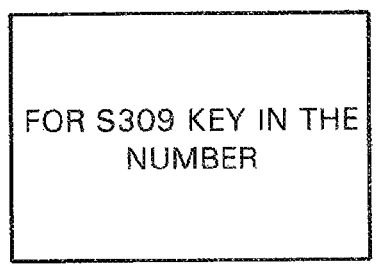 MODE 3
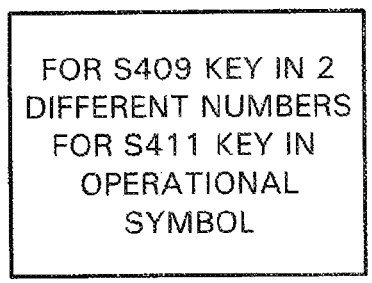 MODE 4
FIG. 4

US 8,961,184 B1

MATHEMATICS TEACHING APPARATUS WITH VISUAL TACTILE AND AUDITORY STIMULI

FIELD OF THE INVENTION

The invention relates to apparatus for teaching mathematics to young children using a combination of visual, tactile and auditory stimuli.

BACKGROUND OF THE INVENTION

The teachings of mathematical techniques and apparatus have been used to try to achieve this goal. The types of apparatus used include passive items such as flash cards, numeric boards, balance beams, beads, etc. Active type apparatus includes devices which signal by light or sound the correct identification of a number or the solving of a simple equation.

Various studies have shown that the learning experience of a young child is enhanced by using a plurality of physical stimuli at the time of a learning event. It is postulated that the more stimuli that are used at the same time to demonstrate a particular event, the more effective will be the learning experience and the achievement of positive learning results. In addition, the learning experience for the young child should be made as pleasant as possible, to maintain interest while either performing a learning experience activity or watching it being performed. The learning experience is enhanced if the student has a sense of mastery of the subject, that is, has the experience of achieving positive results for the effort expended.

BRIEF DESCRIPTION OF THE INVENTION

The present invention is an electronic apparatus that presents the child performing an activity in learning mathematics with a plurality of physical stimuli and an indication of achieving a positive result. In accordance with the invention, there are a plurality of numeric cards. Each numeric card has a visible number, preferably of a single digit from 0 to 9 for young children although each of the cards can have two or more digits. Each numeric card also has an electronic code that corresponds to the numeric value of the visible number. There also are arithmetic operational cards each having a visible symbol corresponding to a mathematical operation of addition, subtraction multiplication and division. Each arithmetic operation card also has an electronic code that corresponds to the visibly displayed operation.

The apparatus also includes a plurality of unit weight objects, such as cubical shaped blocks, each of which corresponds to one numerical unit, that is the number 1, or a multiple of one numeric unit, for example the number 5. There is a weighing device, such as an electronic scale having a digital output, on which the unit weight objects are placed. The student places unit weight objects on the scale which produces a unit weight number value signal that is the total of the numeric value of the unit weight objects on the scale.

There are a first and second card readers, each for accepting and reading the electronic code from a numerical card and for producing a respective number value signal corresponding to the visible number value of the accepted numeric card or cards. A third card reader accepts an arithmetic operation card and reads its corresponding electronic code and produces an operational signal. The three card readers are preferably mounted in a housing that has a visual display and sound apparatus formed by a sound chip and a speaker. The apparatus also includes a microprocessor that receives the number value signal produced by the first and second card readers, the operational signal produced by the third card reader, and the unit weight number value signal.

A plurality of learning modes are available using the apparatus of the invention. The microprocessor is programmed to control the operation of the display and speaker apparatus to display and/or speak the result of a selected type of learning mode. In a first mode, the child presents a numerical card to one or both of the first and second card readers and a number value signal is produced that is supplied to the microprocessor. The student then places one or more of the unit weight objects on the scale that he thinks corresponds to the card numbers and the scale produces the unit weight number value signal that is supplied to the microprocessor. The microprocessor operates to produce a result signal of the comparison of the number value signal and the unit weight number value signal. The processor operates the speaker and/or display as selected to enunciate and/or display a message that the value of the unit weight objects placed on the scale equals the visible number on the numeric card or cards or that there are not enough or too many unit weight objects on the scale. In the latter two cases the student is instructed to try again by adding or taking away unit weight objects for the scale. The operation is repeated until a correct answer is obtained.

In a second learning mode, a numeric card is accepted in both the first and second card readers and an arithmetic operation card in the third card reader. This constructs an equation and the processor uses the number value and operational signals from the card readers and performs the calculation of the equation and produces a solution value signal, much like a calculator. The student tries to solve the equation by placing unit weight objects on the scale. The microprocessor operates to compare the unit weight number value signal produced by the scale with the solution value signal which is the numerical result of the equation solution. The student is informed by the speaker and/or display as to whether the equation has been correctly solved or if unit weight objects have to be added to or taken away from the scale. In the cases of the student not correctly solving the equation, the steps of the student placing unit weight objects on or removing them from the scale and informing the student of the result are repeated.

The system is bi-directional and provides third and fourth learning modes that respectively correspond to the first and second modes. That is, in a third mode a student or the teacher places one or more unit weight objects on the scale and the unit weight number value signal corresponding to the number of weight units placed on the scale is supplied to the processor. This number can be displayed or announced as an aid in teaching the student how to count. The student then selects a numeric card or cards having the number that the student believes corresponds to the number of unit weights on the scale and places the cards in one of the first or second card readers which produce the number value signal. The microprocessor compares the unit weight number value signal and the number value signal and operates the speaker and/or the display to advise the student if the number on the numeric card or cards selected is the correct number that corresponds to the number value of unit weight objects placed on the scale, or that the number is too high or too low. In the latter cases the student adds weights to or takes them away from the scale, the comparison of the number value signal and the unit weight number value signal, and the result is made known to the student. This is continued until the correct result is obtained.

In a fourth learning mode, a number of unit weight objects are placed on the scale. The student tries to construct an equation having a numerical solution value that corresponds to the numerical value of the unit weight objects on the scale. This is done by placing two of the numeric cards and one with a mathematical operation symbol in the card readers to form the equation. The correctness of the result of the card selection that builds the equation is displayed and/or enunciated as described for the third mode. The student modifies the equation until it has a solution value that is that of the numerical value of the unit weight objects on the scale.

The apparatus includes a keypad with numbers and mathematical operational symbols, such as found in an electronic calculator. The numbers and the operational symbols on the keypad can be used to replace the numeric and operational cards that are presented to the card readers in the four learning modes described above. That is, the keypad operates in an analog version of all of the four learning modes previously described.

The apparatus can operate incrementally as one unit weight object at a time is placed on or removed from the scale or in a batch mode as a group of weight unit objects are placed on or removed from the scale at the same time. As previously indicated, a weight object can have a multiple unit number value. The display also can display messages which can be in color to signal progress, that is for example, red for too may unit weights, yellow for not enough and green for the correct number.

BRIEF DESCRIPTION OF THE DRAWINGS

Other objects and advantages of the present invention become more apparent upon reference to the following specification and annexed drawings in which:

FIGS. 3A-3D are flow charts showing the operation of the apparatus of the present invention in various modes of operation; and FIG. 4 illustrates the operation of the keypad functions in the various learning modes.

DETAILED DESCRIPTION OF THE INVENTION

Figure 1:
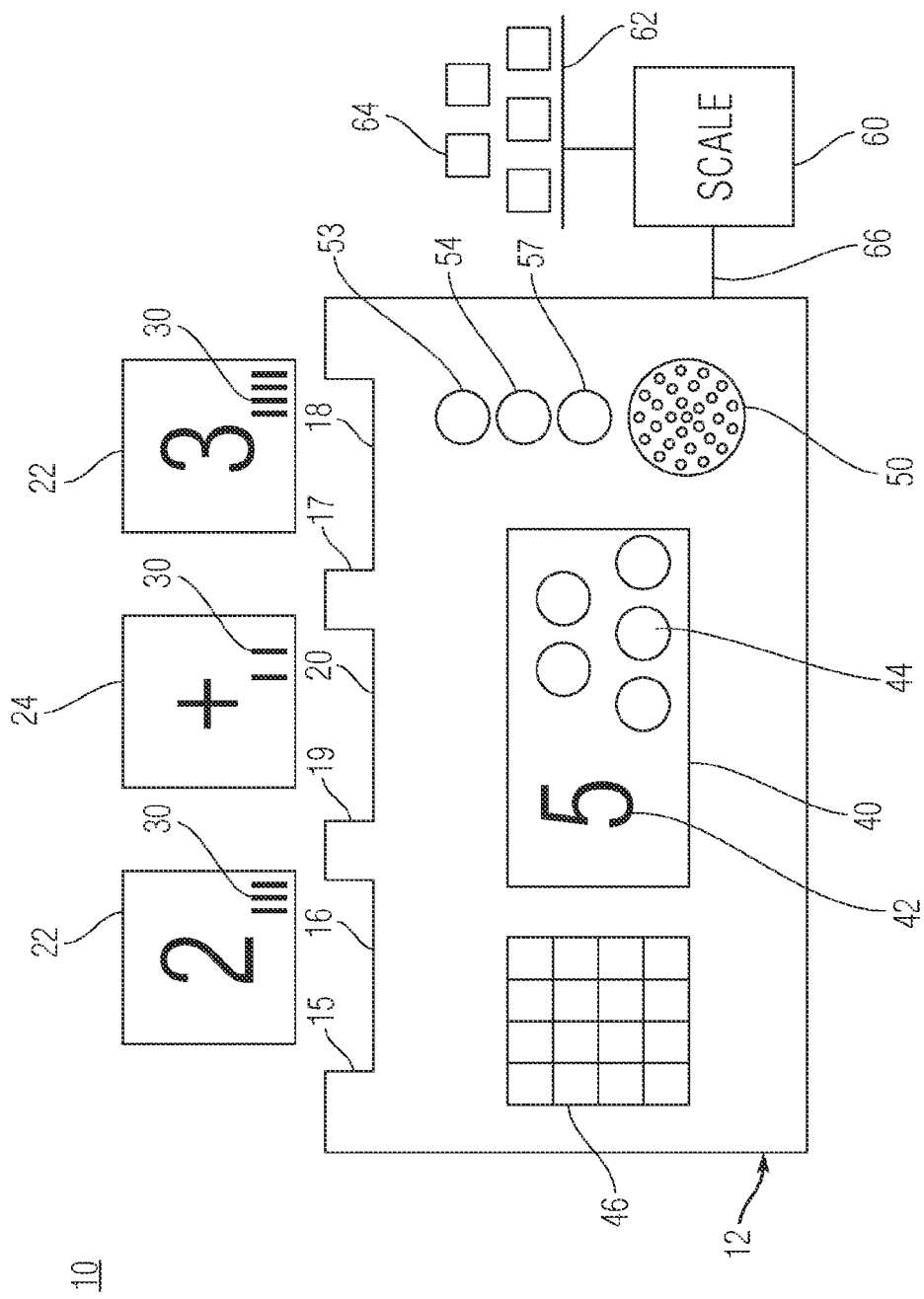
FIG. 1 is a diagrammatic view of the apparatus of the present invention.
Figure 2:
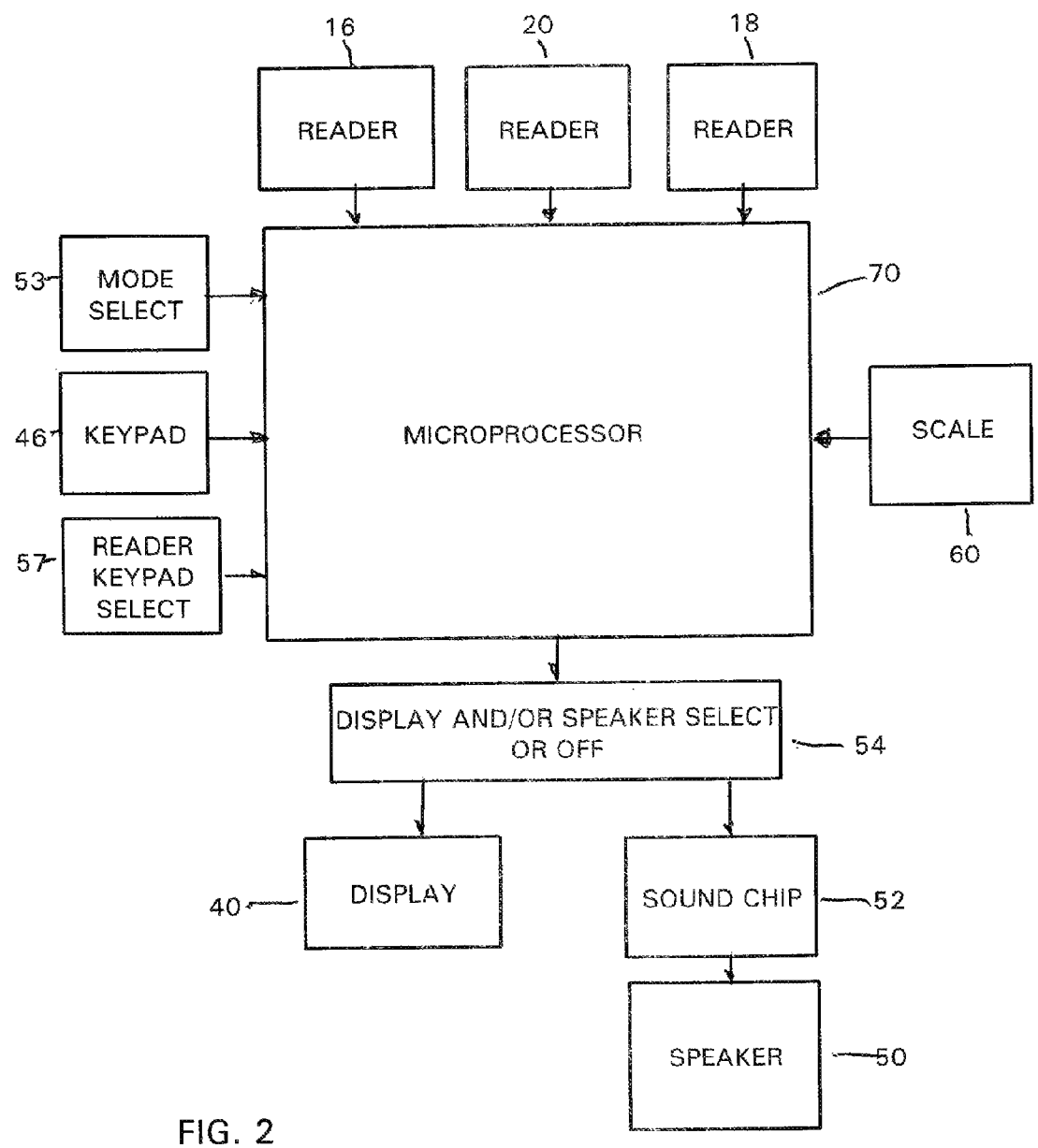
FIG. 2 is a schematic diagram of the electronic circuit of the apparatus of FIG. 1.

Referring to FIGS. 1 and 2, there is a housing 12 of a suitable material, such as a plastic that is resistant to breakage. The housing 12 is illustratively shown as having three slots 15, 17, and 19 to access card readers 16, 18 and 20 within the housing, respectively. The two end slots 16 and 18 are for receiving a type of card 22, hereafter called a "numerical card," that has a visible number printed or painted on it. The numeric cards 22 can have a single numerical digit, e.g. 0 to 9, or multiple digits, e.g. 11 to 99. Single digit numeric cards are used at the beginning of the learning experience for younger children. Multiple digit numeric cards with higher numbers will be used as the learning process progresses. The third middle slot 20 is to receive a card 24, hereafter called an "operation card," on which there is a mathematical operational symbol for one of addition, subtraction, multiplication, and division. It is preferred that at least one physical dimension, such as the width, of the numeric cards 22 differ from that of the operation card 24. Therefore, the two slots 15 and 17 for the card readers 16 and 18 would have the same width and the slot 19 for the card reader 20 would have a different width.

A machine readable code 30 is located on each type of card 22 and 24 for use in allowing the card readers 16, 18 and 20 within the housing 12 to recognize the value or operation indicated by the card. Each of the card readers has a conventional construction so that, for example, each card 22 and 24 has a barcode, magnetic stripe, or optically recognized pattern that corresponds to the number or mathematical operation symbol appearing on it.

A machine readable code 30 is on each type of card 22 and 24 for use to be recognized by the card readers 16, 18 and 20 within the housing 12. Each of the card readers is a conventional construction so that, for example, each card 22 and 24 has a barcode, magnetic stripe, or optically recognized pattern that corresponds to the number or mathematical operation symbol appearing on it.

Also within the module housing 12 are suitable electronic circuits and components for operating the apparatus. These include a microprocessor 70 that preferably has an internal memory. Each of the readers recognizes the code on the card and converts it to digital form that is supplied to and is to be used by the microprocessor 70. The card readers 16 and 18 produce number value signals and card reader 20 produces an operational signal.

The housing 12 also includes a display 40. Display 40 is of the conventional LCD or LED type and preferably can display all letters, numbers and pictures, and preferably is also able to display in different colors. The housing 12 also has a conventional keyboard 46 with keys that are numbered 0-9 and keys corresponding to the mathematical operation symbols. Within the housing 12 there is a speaker 50 for producing various sounds and messages generated by a sound chip 52 controlled by the microprocessor 70 as described below. The sound chip is conventional and produces messages as controlled by the microprocessor to be enunciated by the speaker or a headset.

There also is an operation mode selector switch 53 to select the learning mode in which the apparatus is to operate. Additionally, there is a switch 54 by which either one or both of the display 40 and speaker 50 can be selected to operate, or both can be disabled. There also is a card reader/keypad switch 57 which selects operation of the apparatus in response to cards 22 and 24 presented to the card readers or using the keypad 46. The switches 53, 54 and 57 can be of the usual mechanical type or membrane type. They also can be linked with the display 40 and/or speaker 50 to show or enunciate switch selection.

A scale 60 is provided that has a platform 62 on which unit weight objects 64 are placed. While in the drawing the scale is shown separately, it can be integrated with the housing 12. The scale 60 has a sensor, such as a strain gauge, and suitable circuitry that converts the weight of the unit weight objects 64 placed on its platform 62 into digital signal form. This information is conveyed to the microprocessor 70 in the module 10 over leads 66 as the unit weight number value signal. The unit weight objects 64 can have any desired shape, such as cubical. The actual weight of each unit weight corresponds to one number unit of a numeric card 22. For example, five unit weights 64 would correspond to the number 5. There can be a multiple value unit weight object which has an actual weight that is a multiple of a unit weight equal to one number unit. For example, a multiple unit weight of 5 would be of five times larger size, and/or a material of a greater weight density, than the standard unit weight 64 corresponding to one number unit. Therefore, the scale 60 produces a digital unit weight number value signal that corresponds to an actual weight value.

The apparatus has four learning modes of operation as selected by the mode switch 53 that sets the microprocessor to perform the various functions and operations of the selected mode. The four modes are:

1 single or two numeric cards used to teach number identification;

2 two numeric cards and an operational card used to teach the solving of equations;

3 selection of one or two numeric cards to match the value of the weight of the unit weight objects on the scale; and 4 selection of two numeric cards and an operational card to construct an equation to match the weight value of unit weight objects placed on the scale.

The four learning modes are described below referring to the corresponding flow charts of FIGS. 3A-3D for each mode. In the following description of the four modes, it is assumed that the input select switch 57 has been set to select an operation using the cards 22 and 24 presented to the card readers. The alternate mode of operating the apparatus using the keypad is described below with respect to FIG. 4.

Mode 1. See FIG. 3A

S101 mode switch 53 is operated to select the mode

S103 output switch 54 is operated to select whether the display 40, speaker 50, or both the display and the speaker are to be operated. Operation steps S101 and S103 are usually performed by the teacher and these two switches can be key locked if desired.

S105 the student inserts a numeric card 22 in to the slots for one or both of card readers 16 and 18. The number visible to the student on the inserted numeric card is detected by the reader adjacent the slot and is converted to a number value signal in digital form that is supplied to and set into the microprocessor 70 memory. Depending on the number for each of the numeric cards, one or two cards can form almost any number. For teaching young students, it is preferred that numeric cards corresponding to single number digits be used, that is, from 0-9. Thus, two single-digit numeric cards 22 can form any number up to 99.

S107 the microprocessor is programmed to operate one or both of the display 40 or the sound chip and speaker 52, 50 as selected by output switch 54. The display preferably shows both the number on the card and a picture of a number of objects, such as animals, corresponding to the number of the card. The microprocessor can be programmed to control the sound chip 52 and speaker 50 to enunciate a phrase such as "You have inserted the number X (where X equals the number on the numeric card or cards)" or to just speak the number.

S109 the student places an amount of the unit weight objects 64 on the scale platform 62 that he thinks will correspond to the visible number of the card or cards 22. The teacher can instruct the student to place only one unit weight object 64 at a time on the scale platform or to place any number of the unit weight objects that the student wishes. The multiple value unit weights also can be used. The scale converts the numeric weight value of the unit weight objects on its platform into a digital unit weight value number signal that is supplied to the microprocessor 70.

S111 The microprocessor 70 operates the display 40 and/or the speaker 50 as selected by switch 54 to display a message corresponding to the numerical value of the weight units placed on the scale. This step is optional and can be omitted if desired.

S113 the microprocessor compares the unit weight value number signal supplied to it from the scale in S109 against the number value signal of the value of the number on the numeric card or cards 22 as read by the card reader or readers in S105.

S115 if the result of the comparison of S113 is YES, that is, the unit weight value number signal and the number values signal match, then the microprocessor operates the display and/or speaker to convey the information result such as, "you have placed Y weight units on the scale and that is the correct amount"

S117 if the result of the comparison of S113 is NO, that is, the unit weight value number signal and the number value signal of the numeric card or cards 22 do not match, then the microprocessor operates the display and/or speaker to convey one of the two information results: "You are not correct because you have placed Y weight units on the scale and that is not enough", or "You are not correct because have placed Y weight units on the scale, and that is too many". There can also be a direction to add or remove weights. As an alternative, there can be only a simple message that: "You are not correct so please try again". The student returns to step S109 and weight units are added to or removed from the scale. S111 and S113 are repeated until the comparison results in a YES so that the success message of S115 is produced by the display and/or speaker.

Mode 2. See FIG. 3B

S201 switch 53 is operated to select the mode.

S203 switch 54 is operated to select whether the display 40, speaker 50, or both display and speaker are to be operated. Like S101 and S103 described above, these steps are usually performed by the teacher and these two switches can be key locked if desired.

S205 a numeric card 22 is inserted into the slots for each of the card readers 16 and 18 and first and second number value signals are produced and supplied to the microprocessor.

S207 an operation card 24 with a mathematical operational symbol is inserted into the card reader 20 slot and a mathematical operational signal is produced and supplied to the microprocessor. In S205 and S207 the teacher can provide the cards to the student to control the degree of difficulty of the equation to be solved and the manner in which the student is progressing with the learning experience. That is, the teacher would normally start with simple equations of addition and subtraction with lower value numbers and progress to more difficult equations with higher numbers and multiplication and division operations.

S209 after the three cards are inserted into the card reader slots the microprocessor operates like a conventional calculator in response to the first and second number value signals and the mathematical operational signal to solve the equation and produce a numerical solution value signal for the equation. This is stored in the microprocessor. The microprocessor can be programmed to operate the display 40 to display the equation and/or enunciate it by way of the sound chip 52 and the speaker 50 with a message such as: "What is the number of weight units that solves the problem $X+Y=?$". This instructs the student to associate equations with the numbers on the numeric cards 22 and the arithmetical operational symbol on an operational card 24.

S211 the student places an amount of the unit weight objects 64 on the scale 62 that he thinks will solve the equation. The teacher can instruct the student to place only one unit weight object at a time on the scale platform or to place any number that the student wishes. The scale converts the number value of unit weight objects on its platform into the digital unit weight number value signal that is supplied to the microprocessor.

S213 the microprocessor operates in response to the unit number weight value signal information supplied by the scale to display or enunciate the number of unit weight units on the scale. This step is optional.

S215 the microprocessor 70 compares the unit weight value number signal from the scale 60 produced in S211 against the numerical solution value signal produced in S209, this being the numerical solution of the equation as set by the three cards inserted in the card readers in steps S205 and S207.

S217 if the result of the comparison of S215 is YES, that is, the unit weight value number signal and the equation numerical solution value signal match, then the microprocessor operates the display and/or speaker to convey the information result: "You have placed Z weight value on the scale and that is the correct amount to solve the equation X+Y=Z."

S219 if the result of the comparison of S215 is NO, that is, the unit weight value number signal and the equation numerical solution signal do not match, then the microprocessor operates the display and/or speaker to convey a simple "you are incorrect, try again, message or one of the two information results: "you are incorrect because you have placed X weight value on the scale and that is not enough", or "you are incorrect because you have placed Y weight value on the scale, and that is too many". There also can be a direction to add or remove weights. The student returns to step S211 and weight unit objects are added to or removed from the scale. S211 and S213 are repeated until the comparison result of S215 is a YES so that the success message of S217 is produced by the display and/or speaker.

Mode 3. See FIG. 3C.

As indicated above, the apparatus is bi-direction and mode 3 is substantially the reverse of mode 1. The teacher can use it to check the progress of the student.

S301 mode 3 is selected.

S303 operation of one or both of the display and or speaker is selected.

S305 one or more of the unit weight objects is placed on the scale. These can be single or multiple unit weight value objects. A unit weight value number signal is produced by the scale and supplied to the microprocessor.

S307 the microprocessor stores the unit weight value number signal from the scale. In this mode, it is preferred that only the speaker be actuated and that a message be enunciated as follows: "there are X weight value units on the scale. Insert a card number that corresponds to this number." It is preferred that the numerical value not be displayed. If desired, the enunciation of the numerical value of the unit weight objects can be omitted.

S309 the student takes the one or two numeric cards 22 that he thinks corresponds to the value of the unit weight objects on the scale and places it or them into the slots of the card readers 16 or 18. A number value signal is produced that is supplied to the microprocessor. If two of the number cards 22 are used, then the microprocessor sums the numeric value of the two.

S311 the speaker can be operated to enunciate the message "you have selected the member Y".

S313 the microprocessor compares the unit weight value number signal supplied to it from the scale in S305 with the number value signal of the card or cards 22 as determined in S309.

S315 if the result of the comparison of S313 is YES, that is, the unit weight value number signal and the number value signal of the number on the card or cards 22 match, then microprocessor operates the display and/or speaker to convey the information result, "X weight units were on the scale and you have selected the right number card".

S317 if the result of the comparison of S113 is NO, that is, the unit weight value number signal and the number value signal corresponding to the card or cards 22 do not match, then the microprocessor operates the display and/or speaker to convey the message: "You are not correct, try again," or one of the two information results: "You are not correct because X value unit weight is on the scale and number Y that you selected is not enough", or "you are not correct because X is the value unit weight on the scale and the number on the card that you selected is too high". There also can be a direction to select numeric cards 22 with higher or lower numbers. The student returns to S309 and a card or cards 22 with a different number is placed in one or both of the slots for the card readers 16 or 18. S311 and S313 are repeated until the comparison results in a YES so that the success message of S315 is produced by the display and/or speaker.

Mode 4. See FIG. 3D.

Mode 4 is substantially the reverse of Mode 2. The teacher can use it to check the progress of the student.

S401 mode 4 is selected.

S403 operation of one or both of the display and or speaker are selected.

S405 one or more of the weight unit objects is placed on the scale. These can be a single value or multiple value units. A unit weight value number signal is produced by the scale and supplied to the microprocessor.

S407 the microprocessor stores the unit weight value number signal from the scale. In this mode, it is preferred that only the speaker be actuated and that a message be enunciated "there are X weight value units on the scale. Build an equation that corresponds to this number." The numerical value can be displayed.

S409 the student takes two of the numeric cards 22 and places them into the slots for the card readers 16 and 18. These correspond to the numbers X and Y of the equation that the student is constructing to correspond to the weight value of the unit weight objects on the scale. The card readers produce first and second number value signals that are supplied to the microprocessor.

S411 the student places an arithmetic operation card 24 in the slot for the card reader 20. The mathematical operation signal is supplied to the microprocessor which solves the equation and produces a solution value signal.

S413 the speaker can be operated in response the first and second number value signals and the arithmetic operation signal to enunciate the message of the equation and the solution value, that is, "you have built the equation X plus Y which equals Z".

S415 the microprocessor compares the unit weight value number signal supplied to it from the scale in S405 with the solution value signal of S411.

S417 if the result of the comparison of S415 is YES, that is, the unit weight value number signal and the solution value signal match, then the microprocessor operates the display and/or speaker to convey the information result, "Z weight units were on the scale and you have used the right equation X plus Y equals Z".

S419 if the result of the comparison of S415 is NO, that is, the unit weight value number signal and the equation solution value signal do not match, then the microprocessor operates the display and/or speaker to convey the message "not correct, try again" or one of the two information results: "Z value of weight units are on the scale and the numbers X and Y that you selected are not enough", or "Z weight value units are on the scale and the numbers X and Y that you selected is are too high". There also can be a direction to select cards with higher or lower numbers. The student returns to S409 and a card 22 with a different number is placed in the slot of one or both of the readers 16 or 18. S411 and S413 are repeated until the comparison of the S415 results in a YES so that the success message of S417 is produced by the display and/or speaker.

The four modes of teaching described above using the numeric cards 22 and operation cards 24 can be replicated without using the cards, and instead using the keypad 46 of the housing. In this alternate mode of operation of the apparatus, the switch 57 is operated to select keypad operation. This disables the card readers and the keypad supplies the number value and the operational signals to the microprocessor. The mode selection switch 53 is operated as previously described to select the learning mode. FIG. 4 illustrates the use of the keypad to supply these signals in each of the modes.

In any of the modes described above, the display 40 can display a correct value result in one color such as green, an excess weight value in red and a deficiency of weight in yellow. Other similar messages can be used. Alternatively, there can be a buzzer to signal not enough or too many weight units and a bell sound when a match is made. Also, any number result can be displayed together with a picture of a number of items that correspond to the number on the card. That is, for example, if the number 4 is printed on the card the visual display will show suitable corresponding indicia such as four blocks, or four animals, etc.

The operation of each of the four learning modes of the apparatus provides the student with the stimuli of visually seeing the unit weight objects and numbers, tactile in placing the unit weight objects on the scale, and sound and sight in seeing and hearing the results. Further, a group of students can watch each other and the teacher perform the various operations. All of these enhance the learning experience.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. Apparatus for teaching mathematics, comprising:
   a plurality of numeric cards each having a visible number thereon and electronically readable data code corresponding to the visible number;
   a plurality of unit weight objects each having a unit weight value number;
   a scale on which at least one of said unit weight objects is placed and which produces a unit weight value number signal corresponding to the number value of the at least one unit weight object on said scale;
   first and second card readers each for reading the code data of a said numeric card and producing a number value signal corresponding to the visible number value of at least one said numeric card read by said first and second card readers;
   a processor for comparing said number value signal from at least one of said first and second card readers and said unit weight number value signal and producing a result signal; and
   at least one of a selectively operated visual display and sound apparatus operated by said processor for respectively displaying and enunciating said result signal in terms of a match or a difference between said number signal and said unit weight number value signal.

2. The apparatus as claimed in claim 1 wherein said processor further operates said at least one visual display and sound apparatus to display or enunciate said result signal in terms of a match, a deficiency or an excess in the difference between said number value signal and said result signal.

3. The apparatus as claimed in claim 1 wherein a said numeric card is accepted by both said first and second card readers and said processor uses the signals from both said first and second card readers to form said number value signal for comparison with said unit weight number value signal by said processor.

4. The apparatus as claimed in claim 3 wherein said processor further operates said at least one visual display and sound apparatus to respectively display and enunciate said result signal in terms of a match, a deficiency or an excess in the difference between the number value signal and said result signal.

5. The apparatus as claimed in claim 2 wherein said visual display produces a display in respectively different colors for a match, a deficiency and an excess.

6. The apparatus as claimed in claim 1 further comprising a switch for selecting the operation of either or both of said visual display and said sound apparatus.

7. The apparatus as claimed in claim 1 further comprising a keypad having number keys for keying in at least one number from which said number value signal is produced.

8. The apparatus as claimed in claim 1 wherein said microprocessor being capable of operating to produce said result signal either in a first mode in response to unit weight objects being placed on said scale to correspond to the number on a said numeric card presented to at least one of said first and second card readers, or in a third mode in which numeric cards are presented to at least one of said first and second card readers to produce a number value signal to be compared to a unit weight number value signal produced by said scale in response to at least one unit weight object already on said scale.

9. The apparatus as claimed in claim 8 further comprising a switch to select operation of said processor to operate in one of said first or third modes.

10. The apparatus as claimed in claim 1 and further comprising:
    a plurality of operational cards each having a visible symbol corresponding to a mathematical operation and a machine readable code corresponding to the mathematical operation symbol viable thereon;
    a third card reader for reading the code on a said operational card presented to said second reader and for producing a function signal corresponding to the mathematical operational signal;
    wherein said processor receives a said number value signal from each of said first and second card readers and said mathematical operation signal from said third card reader forming a numeric equation and operates to first produce a solution signal of said equation, compare said solution signal with said unit weight number value signal from said scale and produces a result signal corresponding to the difference of the numerical values of the solution signal and the unit weights on said scale; and at least one of a selectively operated visual display and sound apparatus responsive to and for respectively displaying and enunciating the result signal.

11. The apparatus as claimed in claim 10 further comprising a keypad having number and mathematical operational keys for keying in the numeric equation from which said processor produces said solution signal.

12. The apparatus as claimed in claim 10 wherein said processor operates to produce said result signal in a second mode in response to unit weight objects being placed on said scale to attempt to match said solution signal of the numeric equation formed by cards in each of said first second and third card and in a fourth mode in which cards are presented to said first, second and third card readers to form an equation from which a solution signal is produced that is compared to a unit weigh value number signal produced by said processor in response to uniform weight objects already on said scale.

13. The apparatus as claimed in claim 12 further comprising a switch to select operation of said processor to operate in one of said second or fourth modes.

14. Apparatus for teaching mathematics, comprising:
a plurality of numeric cards each having a visible number thereon and electronically readable data code corresponding to the visible number;
first and second card readers each for reading the code data of a said numeric card and producing a number value signal corresponding to the visible number value of at least one said numeric card read by said first and second card readers;
a plurality of operational cards each having a visible symbol corresponding to a mathematical operation and a machine readable code corresponding to the mathematical operation symbol visible thereon;
a third card reader for reading the code on a said operational card presented to said second reader and for producing a function signal corresponding to the mathematical operational signal;
a plurality of unit weight objects each having a unit weight value number;
a scale on which at least one of said unit weight objects is placed and which produces a unit weight value number signal corresponding to the number value of the at least one unit weight object on said scale; and a processor that receives a said number value signal from each of said first and second card readers and said mathematical operation signal from said third card reader forming a numeric equation and operates to first produce a solution signal of said equation, compare said solution signal with said unit weight number value signal from said scale and produces a result signal corresponding to the difference of the numerical values of the solution signal and the unit weights on said scale; and
at least one of a selectively operated visual display and sound apparatus responsive to and for respectively displaying and enunciating the result signal.

15. The apparatus as claimed in claim 14 wherein said processor further operates said at least one visual display and sound apparatus to respectively display and enunciate said result signal in terms of a match, a deficiency or an excess in the difference between said solution signal and said result signal.

16. The apparatus as claimed in claim 14 wherein said processor operates to produce said result signal in a second mode in response to unit weight objects being placed on said scale to attempt to match said solution signal of the numeric equation formed by cards in each of said first second and third card and in a fourth mode in which cards are presented to said first, second and third card readers to form an equation from which a solution signal is produced that is compared to a unit weight value number signal produced by said processor in response to uniform weight objects already on said scale.

17. Apparatus for teaching mathematics, comprising:
a plurality of numeric cards each having a visible number thereon and electronically readable data code corresponding to the visible number;
first and second card readers each for reading the code data of a said numeric card and producing a number value signal corresponding to the visible number value of at least one said numeric card read by said first and second card readers;
a plurality of operational cards each having a visible symbol corresponding to a mathematical operation and a machine readable code corresponding to the mathematical operation symbol visible thereon;
a third card reader for reading the code on a said operational card presented to said second reader and for producing a function signal corresponding to the mathematical operational signal;
a plurality of unit weight objects each having a unit weight value number;
a scale on which at least one of said unit weight objects is placed and which produces a unit weight value number signal corresponding to the number value of the at least one unit weight object on said scale; and
a processor that receives a said number value signal from each of said first and second card readers and operates in a first mode to compare said number value signal from at least one of said first and second card readers and said unit weight number value signal and producing a first result signal, and said processor operating in a second mode by receiving said function signal from said third card reader, forming a numeric equation and operating to first produce a solution signal of said equation, compare said solution signal with said unit weight number value signal from said scale, and produce a second result signal corresponding to the difference of the numerical values of the solution signal and said unit weight number value signal; and
at least one of a selectively operated visual display and sound apparatus responsive to and for respectively displaying and enunciating one of said first and second result signals.

18. The apparatus as claimed in claim 17 wherein said processor operates to produce said result first signal either in a first mode in response to unit weight objects being placed on said scale to correspond to the number on a said numeric card presented to at least one of said first and second card readers, or in a third mode in which numeric cards are presented to at least one of said first and second card readers to produce a number value signal to be compared to a unit weight number value signal produced by said scale in response to at least one unit weight object already on said scale; and
wherein;
said processor operates to produce said second result signal in a second mode in response to unit weight objects being placed on said scale to attempt to match said solution signal of the numeric equation formed by cards in each of said first second and third card and in a fourth mode in which cards are presented to said first, second and third card readers to form an equation from which a solution signal is produced that is compared to a unit weight value number signal produced by said processor in response to uniform weight objects already on said scale.

19. The apparatus as claimed in claim 18 wherein said processor further operates said at least one visual display and sound apparatus to display or enunciate said first result signal in terms of a match, a deficiency or an excess in the difference between said number value signal and said result signal and said second result signal in terms of a match, a deficiency or an excess in the difference between said solution signal and said result signal.

20. The apparatus as claimed in claim 19 further comprising a keypad having number and mathematical operational keys for keying in at least one number from which said number value signal is produced and the numeric equation from which said processor produces said solution signal.

* * * * *